(12) United States Patent
Movlazada et al.

(10) Patent No.: US 10,094,444 B2
(45) Date of Patent: Oct. 9, 2018

(54) CENTRIFUGAL PENDULUM DEVICE

(71) Applicant: Schaeffler Technologies AG & Co. KG, Herzogenaurach (DE)

(72) Inventors: Parviz Movlazada, Rastatt (DE); Stephan Maienschein, Baden-Baden (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 136 days.

(21) Appl. No.: 15/023,661

(22) PCT Filed: Sep. 8, 2014

(86) PCT No.: PCT/DE2014/200449
§ 371 (c)(1),
(2) Date: Mar. 21, 2016

(87) PCT Pub. No.: WO2015/043591
PCT Pub. Date: Apr. 2, 2015

(65) Prior Publication Data
US 2016/0245365 A1    Aug. 25, 2016

(30) Foreign Application Priority Data
Sep. 26, 2013   (DE) .................. 10 2013 219 425

(51) Int. Cl.
*F16F 15/14*   (2006.01)
(52) U.S. Cl.
CPC ........ *F16F 15/145* (2013.01); *F16F 2228/08* (2013.01)

(58) Field of Classification Search
CPC .. F16F 15/145; F16F 15/1457; F16F 15/1471; F16F 15/1407; F16F 15/14;
(Continued)

(56) References Cited

U.S. PATENT DOCUMENTS 2,348,941 A * 5/1944 Ware ...................... F16F 15/145
74/574.3
2,387,776 A * 10/1945 Salomon ............... F16F 15/145
74/574.2

(Continued)

FOREIGN PATENT DOCUMENTS

DE         10331391       2/2005
DE        102010049556    5/2011
(Continued)

*Primary Examiner* — Daniel D Yabut
(74) *Attorney, Agent, or Firm* — Davidson, Davidson & Kappel, LLC

(57) ABSTRACT

A centrifugal pendulum device-for a damper device and/or a torque transfer device has a pendulum mass carrier rotatable around an axis of rotation, on which a plurality of pendulum masses movable relative to the pendulum mass carrier are suspended in the circumferential direction, wherein an individual pendulum mass is suspended by a single guide element on the pendulum mass carrier, and a counter bearing supports this individual pendulum mass individually on the pendulum mass carrier. Another centrifugal pendulum device has a pendulum mass carrier rotatable around an axis of rotation, on which a plurality of pendulum masses movable relative to the pendulum mass carrier are suspended in the circumferential direction, wherein the centrifugal pendulum device is designed in such a way that at least two pendulum masses exhibit different vibration and/or oscillation behavior during operation.

17 Claims, 4 Drawing Sheets

(58) Field of Classification Search
CPC ........ F16F 15/283; F16F 15/223; F16F 15/31; F16F 15/30; F16F 15/1315; F16D 3/79; F16H 41/00; F16H 41/24; F16H 55/14; F16H 2045/0263; B60K 6/105; Y10T 74/2115; Y10T 74/2183; Y10T 74/2184; Y10T 74/2128
See application file for complete search history.

(56) References Cited

U.S. PATENT DOCUMENTS

| | | | | |
|---|---|---|---|---|
| 2012/0080282 | A1* | 4/2012 | Takikawa | F16H 45/02 192/3.28 |
| 2012/0222515 | A1 | 9/2012 | Kinoshita et al. | |
| 2013/0283967 | A1* | 10/2013 | Movlazada | F16F 15/145 74/574.2 |
| 2015/0276014 | A1* | 10/2015 | Aijima | F16F 15/145 74/572.2 |

FOREIGN PATENT DOCUMENTS

| | | | | | |
|---|---|---|---|---|---|
| DE | 102011082957 | A1 * | 3/2013 | ............ | F16F 15/145 |
| DE | 102012214214 | A1 * | 3/2013 | ............ | F16F 15/145 |
| DE | 102012220887 | A1 * | 6/2013 | ............ | F16F 15/145 |
| DE | 102012217958 | A1 * | 4/2014 | ............ | F16F 15/145 |
| DE | 102012223563 | A1 * | 6/2014 | ............ | F16F 15/145 |
| FR | 1045551 | | 11/1953 | | |
| WO | WO 2015014359 | A1 * | 2/2015 | ............. | F16F 15/14 |

* cited by examiner

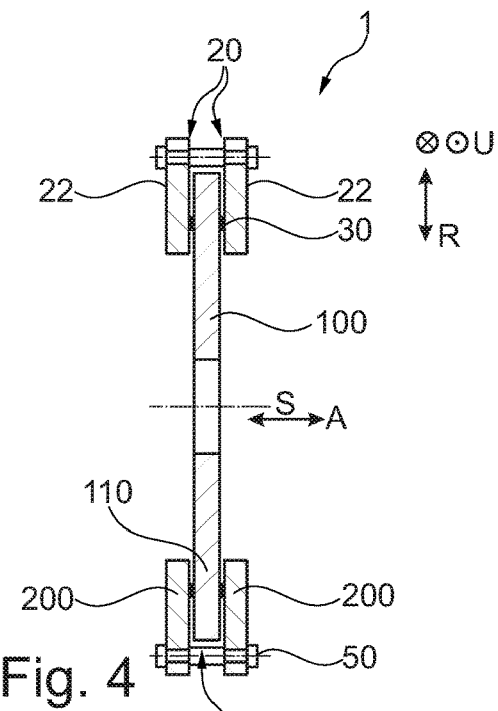
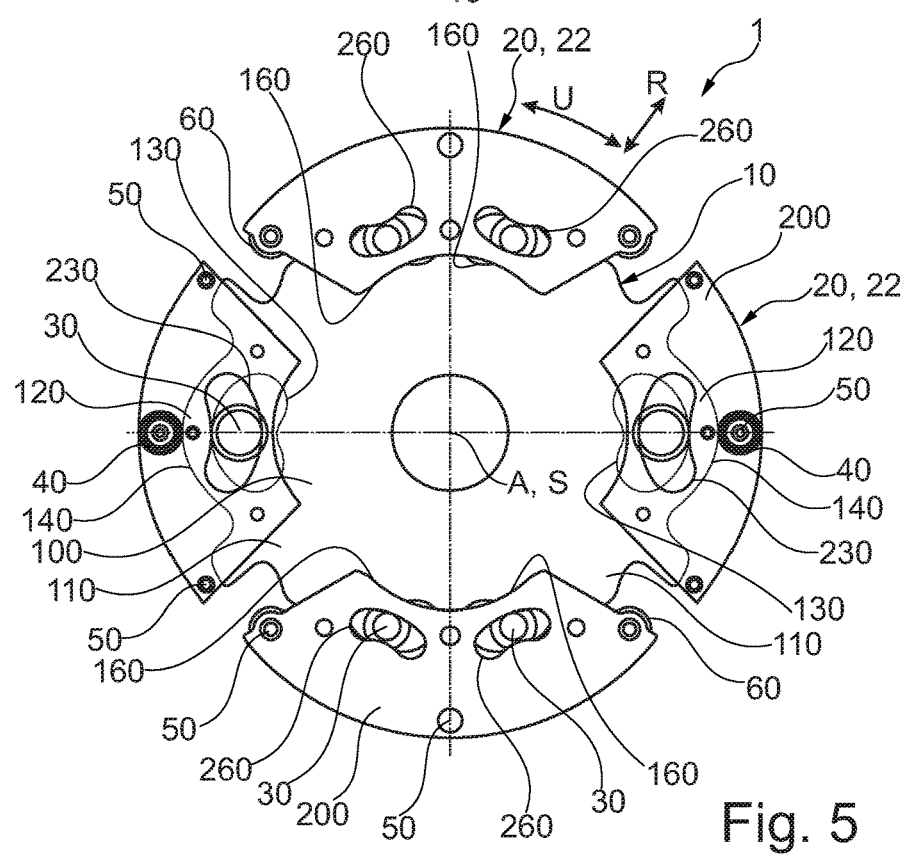

CENTRIFUGAL PENDULUM DEVICE

The present invention relates to a centrifugal pendulum device, in particular a trapezoidal centrifugal pendulum device, for a damper device and/or a torque transfer device, in particular for a drivetrain of a motor vehicle. The invention further relates to another centrifugal pendulum device, in particular a trapezoidal centrifugal pendulum device. Furthermore, the invention relates to a damper device or a torque transfer device, in particular for a drivetrain of a motor vehicle, where the damper device or torque transfer device has a centrifugal pendulum device according to the invention.

BACKGROUND

On shafts of periodically operating machines, for example on a crankshaft of an internal combustion engine of a motor vehicle, torsional vibrations occur during rotational motion of the shaft, their frequency changing with the speed of rotation of the shaft. During combustion processes of the internal combustion engine, in particular in traction mode, torsional vibrations are excited in the drivetrain of the motor vehicle. To reduce these torsional vibrations, a centrifugal pendulum may be provided, which can cancel out torsional vibrations over a relatively large speed range of the internal combustion engine, ideally over its entire speed range.

A centrifugal pendulum is based on the principle that because of centrifugal force its pendulum masses attempt to revolve around an axis of rotation at the greatest possible distance when a rotary motion is introduced. The torsional vibrations in the shaft result in an oscillating relative motion of the pendulum masses, while the centrifugal pendulum has a natural frequency proportional to the speed of rotation, so that torsional vibrations having frequencies that are proportional in the same way to the rotational speed of the shaft can be canceled out over a large rotational speed range.

A centrifugal pendulum includes a plurality of pendulum masses, which are suspended on a rotatable pendulum mass carrier by means of guide elements and are able to carry out a motion along specified guideways relative to the pendulum mass carrier, in order to be able to assume a variable distance from the axis of rotation of the pendulum mass carrier while doing so. As a consequence of the torsional vibrations in the drivetrain, the pendulum masses are excited to oscillate or vibrate, while their centers of mass change constantly and time-shifted relative to the torsional vibrations in the drivetrain, which causes a damping of the torsional vibrations due to mechanical feedback. An efficient damping can be achieved through appropriate coordination of the pendulum masses and their guideways.

SUMMARY OF THE INVENTION

It is an object of the invention to provide an improved centrifugal pendulum device or an improved centrifugal pendulum for a damper device and/or a torque transfer device, in particular for a drivetrain of a motor vehicle. It is further an object of the invention to provide an improved damper device and/or an improved torque transfer device, in particular for a drivetrain of a motor vehicle. At the same time, the centrifugal pendulum device according to the invention should have a comparatively high inertial mass while requiring little construction space in the drivetrain, and should be as economical as possible to produce, install and operate.

The present invention provides a centrifugal pendulum device, in particular a trapezoidal centrifugal pendulum device, for a damper device and/or a torque transfer device, in particular for a drivetrain of a motor vehicle; and by means of a damper device or a torque transfer device, preferably for a drivetrain of a motor vehicle. Advantageous refinements, additional features and/or advantages of the invention derive from the following description.

The centrifugal pendulum according to the invention has a pendulum mass carrier which is rotatable around an axis of rotation of the centrifugal pendulum device, on which pendulum mass carrier a plurality of pendulum masses which are movable relative to the pendulum mass carrier are suspended in the circumferential direction of the centrifugal pendulum device. According to the invention, a single pendulum mass is suspended on the pendulum mass carrier by means of a single guide element (monofilar suspension), a single counter bearing preferably supporting this individual pendulum mass additionally on the pendulum mass carrier. This supporting preferably occurs in such a way that the counter bearing pre-tensions the pendulum mass against its single guide element; that is, it holds the counter bearing together with the guide element on a section, in particular a guide section, of the pendulum mass carrier. As this occurs, the counter bearing is provided on the pendulum mass. In addition to the monofilar suspension of a pendulum mass, a bifilar suspension of a pendulum mass may be used.

The damper device according to the invention or the torque transfer device according to the invention has a centrifugal pendulum device according to the invention. In this case, the damper device or torque transfer device may be, for example, a centrifugal pendulum, a torque converter, a clutch, a Fottinger coupling, a clutch assembly, a damper, a torsional vibration damper, a turbine damper, a pump damper, a dual-mass converter, a dual-mass flywheel, etc., or may have combinations thereof.—The centrifugal pendulum device may be designed here as a mono-roller or as a combined mono-/dual-roller centrifugal pendulum device (see below). The mono-roller centrifugal pendulum device has exclusively monofilar suspensions of its pendulum masses, and the combined mono-/dual-roller centrifugal pendulum device has mono- and bifilar suspensions of its pendulum masses.

In embodiments of the invention, a single guideway of the pendulum mass in the circumferential direction of the pendulum mass is provided, preferably in the center of the pendulum mass. Furthermore, the pendulum mass and its single guideway may be designed essentially mirror-symmetrically in reference to a center line extending in the radial direction of the centrifugal pendulum device. That is, the pendulum mass can be reflected essentially on itself. In addition, the single guideway of the pendulum mass may extend radially outward from its circumferential center section within the pendulum mass, preferably in an arc.

In embodiments of the invention, in the case of merely monofilar suspensions of the pendulum mass carrier for the pendulum masses, all guideways are provided rotationally symmetrical to each other in reference to a guideway directly adjacent in the circumferential direction. Furthermore, these guideways of the pendulum mass carrier for the pendulum masses may always be offset from each other by approx. 180°, approx. 120°, approx. 90°, approx. 72°, approx. 60°, approx. 51.4° or approx. 45° and directly adjacent to each other. In addition, a particular guideway of the pendulum mass carrier may extend radially inward from its circumferential center section within the pendulum mass carrier, preferably in an arc.

According to the invention, the pendulum mass carrier may have a bearing surface, on which the counter bearing can be acted upon, the bearing surface preferably being provided on an outer circumferential edge of the pendulum mass carrier. Furthermore, the counter bearing may be designed as a slide bearing or a roller bearing. For the case where the counter bearing is designed as a roller bearing, the roller bearing is preferably designed as a ball bearing, as a cylindrical roller bearing or in particular as a needle roller bearing. Furthermore, the counter bearing may be designed as a spring support, such that it mechanically pre-tensions the pendulum mass which is firmly mechanically connected to it, radially outward in relation to the pendulum mass carrier. To this end, the spring support preferably has a radial spring, which may be designed as an ondular washer, a rubber spring, a rubber ring, etc.

In embodiments of the invention, the guideways of the pendulum mass carrier, the guideways of the pendulum masses and/or the bearing surfaces of the pendulum mass carrier may be designed in such a way that with an essentially minimal oscillation angle of the centrifugal pendulum device a guide element, a counter bearing assigned thereto, and the axis of rotation lie essentially on an essentially radial straight connecting line, and with an oscillation angle of the centrifugal pendulum device which is greater than a minimal oscillation angle an essentially radial straight connecting line from a guide element and a counter bearing assigned thereto essentially does not run through the axis of rotation.

Furthermore, an individual pendulum mass may include two mass halves positioned one behind the other in the axial direction of the centrifugal pendulum device, the two mass halves preferably being fastened to each other on an outer circumferential section of the pendulum mass by means of at least one fastening element. In this case, the single guideway of the pendulum mass extends in the axial direction through both pendulum masses, preferably completely through. In this case, the counter bearing may be provided essentially in the center on an outer circumferential section of the pendulum mass between the two mass halves, the counter bearing being designed in particular as a fastening element for the mass halves, or a fastening means may be designed in particular as the counter bearing.

Besides the monofilar suspension of a pendulum mass, the centrifugal pendulum device according to the invention may also have a pendulum mass which has a bifilar suspension on the pendulum mass carrier. This means that in addition an individual pendulum mass is suspended on the pendulum mass carrier by means of two guide elements. Monofilar and bifilar suspensions of a large number of pendulum masses may thus alternate in the circumferential direction on the pendulum mass carrier. In this case, a pendulum mass having bifilar suspension may cover a larger section (circular (ring) segment, circular (ring) sector, etc.) in the circumferential direction with regard to arc length than a pendulum mass having monofilar suspension. Furthermore, a pendulum mass having bifilar suspension can have a greater mass than a pendulum mass having monofilar suspension.

In some embodiments of the invention, the counter bearing for a pendulum mass suspended bifilarly on the pendulum mass carrier and the bearing surface assigned thereto are lacking. According to the invention, pairs of guideways of the pendulum mass carrier for the bifilar suspension of pendulum masses in reference to pairs of guideways that are adjacent in the circumferential direction are provided rotationally symmetrically to each other. In addition, pairs of guideways of the pendulum mass carrier for bifilar suspension of pendulum masses may be adjacent to each other at approx. 180°, approx. 120°, approx. 90°, approx. 60° or approx. 45°, while between such pairs of guideways preferably a single guideway for monofilar suspension of a pendulum mass is provided.

In the case of bifilar suspension of the pendulum masses, again a particular guideway of the pendulum mass carrier extends from its center section radially inward within the pendulum mass carrier, preferably in an arc. Furthermore, the two guideways of the pendulum mass carrier in question on the other hand extend from their respective center sections radially outward within the pendulum mass, preferably in an arc. Furthermore, a particular pair of guideways of the pendulum mass is provided in the pendulum mass in the circumferential direction thereof, centered with respect to the pendulum mass.

According to the invention, the centrifugal pendulum device may be designed as a mono-roller centrifugal pendulum device, where at least part of the pendulum masses have monofilar suspension on/in the pendulum mass carrier. In this case, an individual pendulum mass is held by a single counter bearing or a single spring support against the single guide element, or mechanically pre-tensioned. —Furthermore, according to the invention, the centrifugal pendulum device may be designed as a combined mono-/dual-roller centrifugal pendulum device, where part of the pendulum masses have monofilar suspension and part of the pendulum masses have bifilar suspension on/in the pendulum mass carrier.

Between the two mass halves of the pendulum mass, positioned one behind the other in the axial direction, the pendulum mass carrier may be provided; it is also possible, however, for the centrifugal pendulum device to include two pendulum mass carriers, between which pendulum masses which are preferably designed as single-piece or integral individual masses are suspended so that they are movable, i.e., able to oscillate. Furthermore, pendulum masses which are directly adjacent to each other in the circumferential direction may be coupled with each other mechanically by means of a spring and/or damper element. In the case of a combined mono-/dual-roller centrifugal pendulum device, the spring and/or damper elements may be provided only on the pendulum masses having bifilar suspension. The pendulum masses having monofilar suspension have no spring and/or damper elements in such a case. However, stops for the spring and/or damper elements of the pendulum masses having bifilar suspension may be provided on them.

The second centrifugal pendulum according to the invention likewise has a pendulum mass carrier which is rotatable around an axis of rotation of the centrifugal pendulum device, on which pendulum mass carrier a plurality of pendulum masses which are movable relative to the pendulum mass carrier are suspended in the circumferential direction of the centrifugal pendulum device. According to the invention, the centrifugal pendulum device is designed in such a way that at least two pendulum masses exhibit different vibration and/or oscillation behavior during operation of the centrifugal pendulum device. In this case, the centrifugal pendulum device may have, for example, two or more types of different pendulum masses, two or more types of different suspensions of pendulum masses, and at least one device which selectively influences a vibration and/or oscillation behavior of certain pendulum masses. A suspension and/or a pendulum mass may be designed as described above or in the following section.

BRIEF DESCRIPTION OF THE DRAWINGS

The invention will be explained in greater detail in the following section on the basis of exemplary embodiments, with reference to the appended drawing. Elements or components which have an identical, unambiguous or analogous design and/or function are identified in various figures of the drawing by the same reference label. The detailed figures of the drawing show the following:

FIG. 4 a sectional view of a third embodiment of the centrifugal pendulum device according to the invention, wherein the encircling edges of the pendulum masses formed from two mass halves are omitted from the depiction; and FIG. 5 a depiction analogous to FIG. 1 of the third embodiment, wherein a monofilar and a bifilar suspension of two respective pendulum masses of the centrifugal pendulum device are visible.

DETAILED DESCRIPTION

Figure 1:
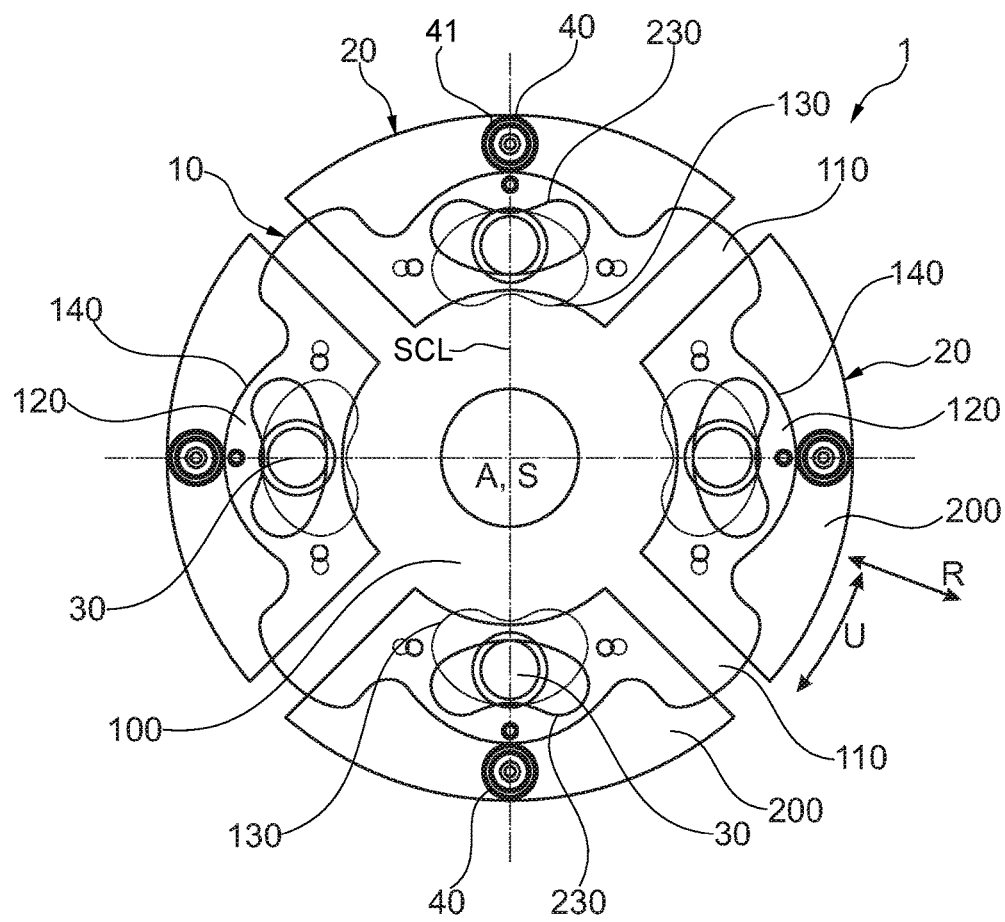
FIG. 1 in a transparent side view, a first embodiment of a centrifugal pendulum device according to the invention, depicted with an essentially minimal oscillation angle of the pendulum masses of the centrifugal pendulum device.

The three embodiments in the drawing each show a centrifugal pendulum device 1, in particular a trapezoidal centrifugal pendulum device 1, or a device for rotational-speed-adaptive vibration absorption 1, for example for a damper device or a torque transfer device, in particular for a drivetrain of a motor vehicle. Also see above for exemplary applications. —The invention is naturally not limited to the embodiments depicted, but rather may be applied to all devices for which a centrifugal pendulum or a centrifugal pendulum device is a meaningful addition.

The features of the three embodiments are transferable to each other; one gets from the first embodiment of the invention to the second, for example, by replacing the pendulum masses 20 of the first embodiment with two mechanically firmly connected mass halves 22 in axial direction A in front of and behind a pendulum mass carrier 10. In the third embodiment of the invention, in each case one monofilar suspension (a single guide element 30 per pendulum mass 20) of part of the pendulum masses 20 is replaced by a bifilar suspension (two guide elements 30 per pendulum mass 20).

Figure 2:
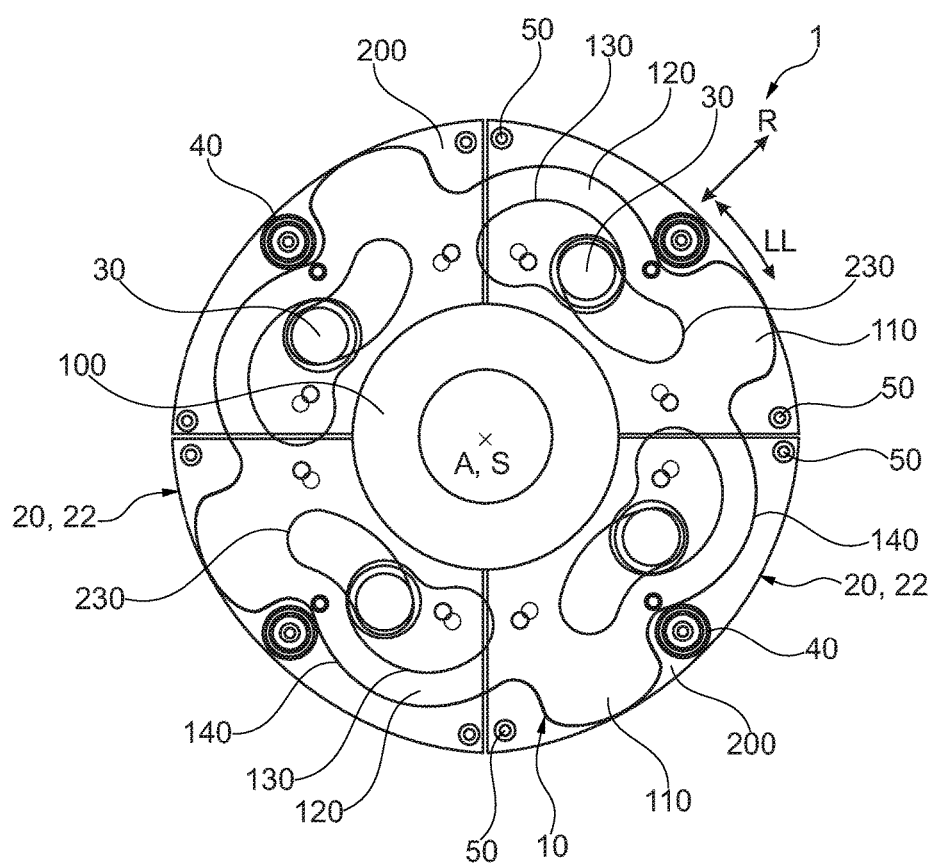
FIG. 2 a depiction analogous to FIG. 1 of a second embodiment, depicted with an essentially maximal oscillation angle of the pendulum masses of the centrifugal pendulum device.

The first embodiment of the invention depicted in FIG. 1 (also see FIGS. 2 and 3) has, movably suspended on a pendulum mass carrier 10 or pendulum flange 10, at least two, but in the present case, four pendulum masses 20, absorber masses 20 or inertia masses 20, which can oscillate in radial direction R and circumferential direction U of the centrifugal pendulum device 1 in relation to the pendulum mass carrier 10, depending on a rotational speed and speed change of the pendulum mass carrier 10 (see FIGS. 1 and 2). It is naturally possible to use a different number of pendulum masses 20, for example three, five, six, seven, eight, etc. The centrifugal pendulum device 1 is rotatable around an axis of rotation S, which is congruent with an axial direction A or a longitudinal direction A of the centrifugal pendulum device 1.

Oscillating movability of the pendulum masses 20 in relation to the pendulum mass carrier 10 is guaranteed for each pendulum mass 20 by exactly a single one guide element 30 which is separate from that pendulum mass 20 and the pendulum mass carrier 10, which may preferably be designed as a rolling element 30, cylindrical roller 30, caster 30, sliding element 30, rivet 30, pin 30, etc. The guide element 30 may be of constant (not shown in the drawing) or stepped design. The separate single guide element 30 is positively guided between the particular pendulum mass 20 and the pendulum mass carrier 10, or guides these two mutually.

In order that a desired relative motion of the pendulum mass 20 in relation to the pendulum mass carrier 10 may take place, each pendulum mass 20 has a single guideway 230, and the pendulum mass carrier 10 has a single guideway 130 for each pendulum mass 20. Both the guideways 130 in the pendulum mass carrier 10 and the respective single guideway 230 in the pendulum masses 20 are referred to as roller breakout. All together, the result is a mono-roller centrifugal pendulum device 1 according to the invention.

The single guideway 230 of the pendulum mass 20 in each case runs from its circumferentially central section in the pendulum mass 20 in circumferential direction U preferably radially outward within the pendulum mass 20, with the guideway 230 preferably running in an arc. Each guideway 130 of the pendulum mass 10 runs from its respective circumferentially central section in circumferential direction U preferably radially inward within the pendulum mass carrier 10, with the relevant guideway 130 preferably running in an arc. That is, the two guideways 130, 230 of the pendulum mass carrier 10 and the pendulum mass 20 belonging to a guide element 30 curve in opposite directions within the centrifugal pendulum device 1.

A basic body 200 of the pendulum mass 20 or of a mass half 22 of the pendulum mass 20 (see below) has a disk-shaped, i.e., flat and comparatively thin basic body 200, for example made from a (formed) stamped sheet. Analogous thereto, a basic body 100 of the pendulum carrier 10 is preferably likewise a disk-shaped, i.e., flat and comparatively thin basic body 100, again made from a (formed) stamped sheet. In the present case, the basic body 100 is only illustrated in such a way that a function of a centrifugal pendulum device 1 is realizable therewith.

However, the basic body 100 of the pendulum mass carrier 10 may be an element of a damper device or a torque transfer device (for exemplary applications again see above). To this end, the basic body 100 has a plurality of radially outer connection sections 110, to which the damper device or the torque transfer device may be coupled mechanically, as a single (material) piece or integrally, where the basic body 100 itself may preferably be a component of this device, for example a flange. The same applies by analogy to a radially inner region of the basic body 100.

Furthermore, the centrifugal pendulum device 1 or the particular pendulum mass 20 has a (preferably single) counter bearing 40, which works together with the guide element 30 during operation of the centrifugal pendulum device 1. Here, the particular counter bearing 40 pre-tensions its pendulum mass 20 radially outward against the pendulum mass carrier 10. This preferably takes place until the relevant guide element 30 is positioned at a radially outer circumferential boundary of the guideway 130 in the pendulum mass carrier 10. The counter bearing 40 is preferably centered on the relevant pendulum mass 20, and thus preferably also centered relative to the guide element 30. A plurality of counter bearings 40 are usable.

The counter bearing 40 is preferably designed as a roller bearing 40 and/or slide bearing 40. As a roller bearing 40, a ball, cylinder or especially a needle roller bearing is preferred. In embodiments of the invention, the counter bearing 40 may have a spring element in the form of a radial spring 41 (FIG. 1) or may be designed as a spring support 40. By means of the springy design, the pendulum mass 20 and the guide element 30 can be mechanically pre-tensioned radially outward relative to the pendulum mass carrier 10. The springy design of the counter bearing 40 is achieved, for example, by means of a radial spring 41, which may be designed, for example, as a radial ondular washer, a rubber spring, a rubber ring etc.

The counter bearing 40 is preferably braced on a bearing surface 140 or a bearing edge 140 of the pendulum mass carrier 10. Such a working surface for the counter bearing 40 on/in the pendulum mass carrier 10, also describable as a guideway 140 or guide edge 140 or rolling face 140 or rolling edge 140 for the counter bearing 40 on/in the pendulum mass carrier 10, runs partially in circumferential direction U and/or radial direction R, in which case, a guide section 120 of the pendulum mass carrier 10, designed in particular as a guide arc 120, is received between the counter bearing 40 and the guide element 30. That is, the guide section 120 is bounded by the guideway 130 for the guide element 30 and the bearing surface 140 for the counter bearing 40.

It is preferred here that both the counter bearing 40 and the guide element 30 be positioned on opposite sides of the guide section 120, and hold and support the relevant pendulum mass 20 on the guide section 120 and thus on the pendulum mass carrier 10, and/or guide it so that it can oscillate. In this case, the guide section 120 itself may be an arc having a constant or changeable diameter in radial direction R, where a form of the arc may be analogous or similar to that of an oscillation path (see below). In this case, the bearing surface 140 itself is preferably an axial edge on the outside (FIGS. 1 through 3) of the pendulum mass carrier 10, or an axial edge inside (not depicted in the drawing), for example of a punch-out of the pendulum mass carrier 10.

The guideways 130 of the pendulum mass carrier 10, the guideways 230 of the pendulum masses 20 and/or the bearing surfaces 140 of the pendulum mass carrier 10 are preferably designed so that at transitional phases of moving pendulum masses 20 and/or at a maximum oscillation angle (FIG. 2) of the centrifugal pendulum device 1, mutual contact of the pendulum masses 20 in circumferential direction U is avoided. Furthermore, a spring and/or damper element (not depicted in FIGS. 1 through 3), for example a leaf spring or rubber element, may be provided in circumferential direction U between two directly adjacent pendulum masses 20. As shown in FIG. 1, at an essentially minimal oscillation angle of the centrifugal pendulum device 1, the guide element 30, counter bearing 40 assigned thereto and the axis of rotation S lie essentially on a straight connecting line SCL.

Furthermore, the centrifugal pendulum device 1 from FIG. 1 may have for its pendulum masses 20 two pendulum mass carriers 10 in opposite positions in axial direction A. The pendulum masses here may likewise be designed as single-piece or integral individual masses. Such an embodiment is advantageous, for example, when one or even two flanges are already present in the drivetrain, on which or between which a centrifugal pendulum device 1 is to be provided. The flange or flanges in this case are not only pendulum mass carriers, but also, for example, an element or elements of a damper device or of a torque transfer device.

Figure 3:
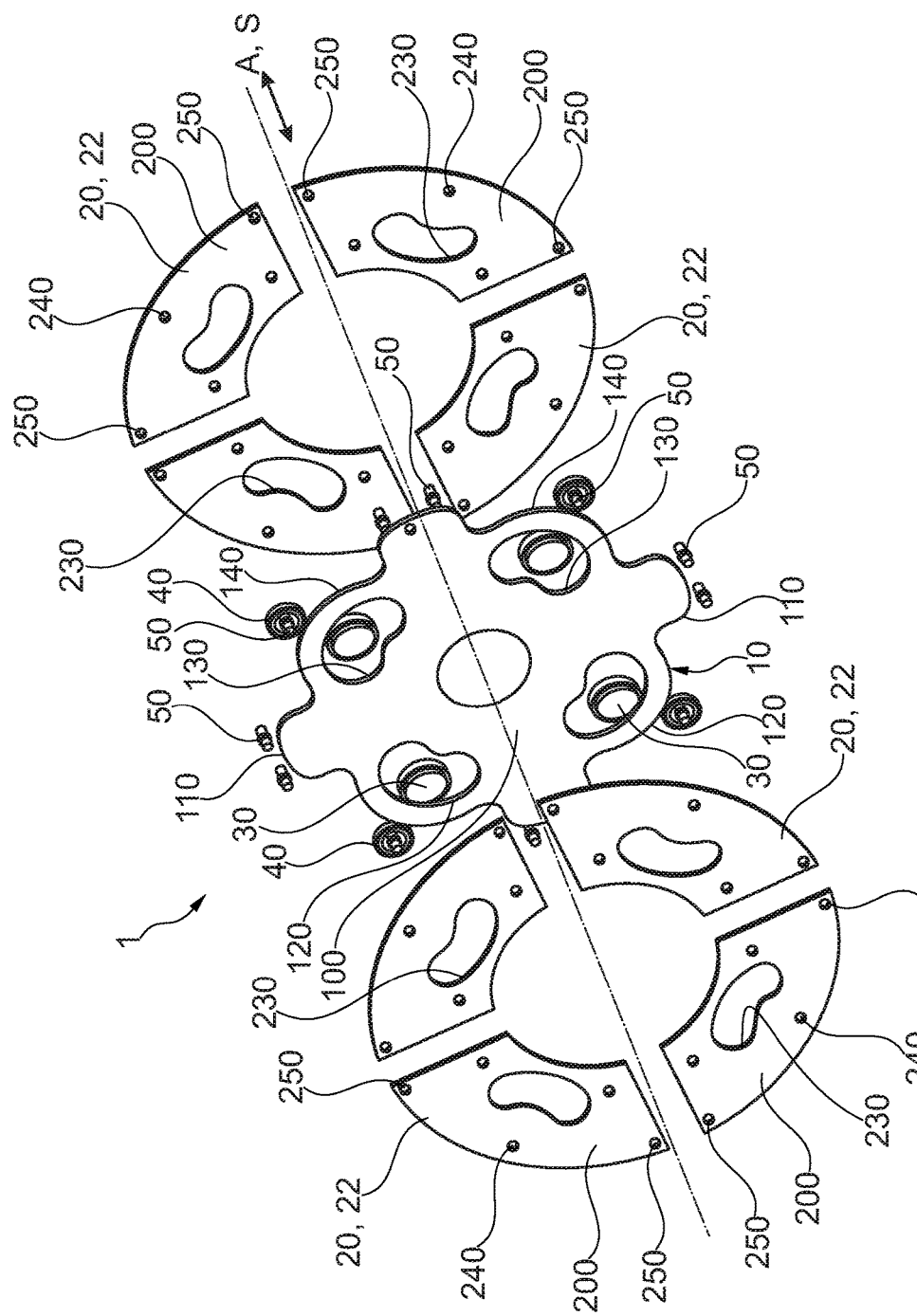
FIG. 3 an exploded perspective view of the second embodiment of the centrifugal pendulum device, having pendulum masses which are formed of two mass halves.

FIGS. 2 and 3 show the second embodiment, which builds on the first embodiment (see FIG. 1), wherein an individual pendulum mass carrier 10 has pendulum masses 20, which each consist of two mass halves 22 in the form of individual masses 22. In this case, the two mass halves 22, combined into one piece, are suspended in axial direction A on both sides of the pendulum mass carrier 10, as explained above. As in FIG. 1 also, each pendulum mass 20 is suspended by a single caster 30 on the pendulum mass carrier 10 in the form of a pendulum flange 10. The roller breakout 230 of the respective pendulum mass 20 is located in the middle of the pendulum mass 10; that is, the roller breakout 230 is provided in the pendulum mass 20, radially symmetrical in reference thereto.

The two mass halves 22 are tied to each other by means of fastening elements 50 (cutouts 250), the fastening elements 50 preferably being rivets 50. Such a rivet 50 may be formed in the center of the pendulum mass 20 as a counter bearing 40, or may support such a counter bearing (see below). The riveted connections between the two mass halves 22 of an individual pendulum mass 20 are located on an outer circumference of the pendulum mass 20. The rivet punchouts of the pendulum flange 10 are open toward the outside in the drawing, but in other embodiments of the invention they may be closed. The rivet punchouts serve to enable the rivets to extend through the pendulum flange 10 and to move relative to the pendulum flange 10 in circumferential direction U.

The counter bearing 40 is preferably positioned on a middle rivet 50, which preferably lies on a radial axis of symmetry of the relevant pendulum mass 20. The latter may be constructed as explained above. The counter bearing 40 or the spring support 40 is pressed against the bearing surface 140 or rolling face 140 of the pendulum flange 10 by the spring element; that is, the pendulum mass 20 is pre-tensioned between the caster 30 and the counter bearing 40. The pendulum masses 20 remain held by this mechanical pre-tensioning when standing still and when the centrifugal pendulum device 1 is rotating comparatively slowly. An oscillation path and a rotation of the pendulum masses 20 during deflection are guaranteed by interaction of the caster 30/roller breakout 130 and counter bearing 40/bearing face 140.

According to the invention, the relevant pendulum mass 20 is mechanically pre-tensioned against the caster 30 by means of a spring support 40, the support 40 being positioned in the center of the pendulum mass, and there preferably on a middle riveted connection (cutout 240). The support 40 is braced against an inner side of the relevant rivet breakout (open toward the outside in the drawing), and rolls/slides on the latter. Here, as in the first embodiment as well, the caster 30 may be stepped or continuously cylindrical. —The oscillation path, and the guide section 120 or guide arc 120 of the centrifugal pendulum device 1, may consist of a circular segment or arc, a plurality of circular segments or arcs, a curve or arc that deviates from a circle, an epicycloid, a torsichrone (shape), etc. This naturally applies to both embodiments of the invention.

According to the invention, an alternative and more compact centrifugal pendulum device 1 results compared to the existing art, in particular a trapezoidal centrifugal pendulum device 1. The pendulum masses 20 are suspended on the pendulum flange 10 by means of a centered roller 30 each, and are pre-tensioned against the roller in each case by means of a spring counter bearing 40. Because of its single-roller concept, the centrifugal pendulum device 1, while taking up little construction space in the drivetrain, has a comparatively high inertial mass, since no second roller breakout has to be made, and furthermore the counter bearings 40 are also still provided on the pendulum masses 20. Furthermore, the centrifugal pendulum device 1 is economical to produce, install and operate.

Within a given construction space, possible motion paths of a centrifugal pendulum device 1 result depending on the type of suspension, which is favorable for certain operating requirements with regard to an attainable restoring torque, and thus a vibration insulation, but not for other operating requirements. If the operating requirements change, for example in the operation of an internal combustion engine having cylinder activation/deactivation, then the pendulums, i.e., the pendulum masses 20, are optimizable only to a certain state (oscillation path, mass distribution). —This problem can be solved according to the third embodiment of the invention depicted in FIGS. 4 and 5, a combination of pendulum masses 20 with a different number of bearing points for path guidance and mass distribution. —In the following section, essentially the differences from embodiments one and two are explained.

The third embodiment of the invention shows a combined mono/dual roller centrifugal pendulum device 1 having mono- and bifilar suspensions of the pendulum masses 20 on/in a single centrifugal pendulum device 1. It is preferred here that the monofilar suspensions of the pendulum masses 20 alternate with the bifilar suspensions in circumferential direction 20. It is also preferred that, possibly in each case, two pendulum masses 20 having monofilar suspensions be positioned opposite each other in radial direction R, and that in analogy thereto, again possibly in each case, two pendulum masses 20 having bifilar suspensions likewise be positioned opposite each other in radial direction R. In this case, the monofilar suspensions of the pendulum masses 20 are preferably constructed as explained above.

A bifilar suspension of a pendulum mass 20 is made in such a way that it has two guideways 260 (a pair) side-by-side in circumferential direction U, which correspond to two guideways 160 (a pair) of the pendulum mass carrier 10, which are likewise side-by-side in circumferential direction U. In the guideways 160/260 assigned to each other there is in each case a guide element 30 to provide swinging support for the pendulum mass 20; that is, a single pendulum mass 20 has swinging support by means of two guide elements 30 on/in the pendulum mass carrier. In this case, it is preferred to dispense with the counter bearing 40 explained above.

Outside of the pendulum mass carrier 10, the two pendulum masses 20, which are preferably made up of two mass halves 22, are preferably tied to each other by means of fastening elements 50. In particular, three fastening elements 50 come into use here, the two mass halves 22 being tied to each other at each circumferential end section and in the middle between them. In this case, a spring and/or damper element 60 (also usable in the first two embodiments) may sit on a fastening element 50 of a circumferential end section. Furthermore, the spring and/or damper element 60 may also be attached directly to the pendulum mass 20.

Furthermore, to improve torsional vibration reducing, adaptive absorption systems 1, i.e., centrifugal pendulum devices 1, according to the invention a combination of centrifugal pendulum devices 1 with different suspension and/or different pendulum masses 20 etc. is proposed. It is important here that this causes different vibration and/or oscillation behavior of the pendulum masses 20 during operation of the centrifugal pendulum device 1, so that different vibration problems within the drivetrain of the motor vehicle can be dealt with. That is, the pendulum masses 20 exhibit different behavior at a particular operating point. Two, three or more types of suspensions of the pendulum masses 20 may be used here in twos, threes or fours: of pendulum masses 20, of dampers of pendulum masses 20, etc.

That is, the centrifugal pendulum device 1 may have two or more different types of pendulum masses 20. Features of different pendulum masses 20 are, for example, a different weight, a different distribution of masses, a different shape, a different arc length, a different height, a different thickness, a different axial and/or radial position, different materials, etc. —Furthermore, the centrifugal pendulum device 1 may have two or more types of different suspensions of pendulum masses 20. Features of different suspensions of pendulum masses 20 are, for example, a monofilar or bifilar suspension, a (mean) radius of the suspension, a position of the suspension, etc. Furthermore, the centrifugal pendulum device 1 may have at least one device which exerts influence selectively on a vibration and/or oscillation behavior of certain pendulum masses 20.

Thus, with a specified construction space it is possible to achieve an improvement in attainable restoring torques, in particular under changing operating demands, such as for example activatable and deactivatable cylinders. At the same, more suitable path guiding and mass distribution may be designed.

| Reference labels | |
|---|---|
| 1 | centrifugal pendulum device, in particular trapezoidal centrifugal pendulum device, device for rotational-speed-adaptive vibration absorption, absorber system |
| 10 | pendulum mass carrier, pendulum flange |
| 20 | pendulum mass, absorber mass, inertial mass, e.g., having two mass halves 22 positioned one behind the other (second embodiment) or only a single mass (first embodiment) |
| 22 | mass half, individual mass of the pendulum mass 20 |
| 30 | guide element for swinging support of the pendulum mass 20, in particular roller element, cylindrical roll, caster, sliding element, rivet, pin, continuous or stepped |
| 40 | counter bearing possibly having spring element, spring support for guide element 30, in particular roller bearing (ball, cylinder, preferably needle roller bearing) and/or slide bearing, preferably having radial spring, e.g., radial ondular washer, rubber spring, rubber ring, etc., preferably provided on a fastening element 50 |
| 50 | fastening element for tying together two mass halves 22 positioned one behind the other axially into a pendulum mass 20, preferably a rivet; may be formed in the center of the pendulum mass 20 as a counter bearing 40 |
| 60 | spring element and/or damper element |
| 100 | disk-shaped, i.e., flat and comparatively thin basic body of the pendulum mass carrier 10 |
| 110 | connecting section of the pendulum mass carrier 10 on damper device, torque transfer device, etc. |

-continued

| Reference labels | |
|---|---|
| 120 | guide section, guide arc for pendulum mass 20 constituted as a guideway 130 for the guide element 30 and bearing surface 140 for the counter bearing 40 |
| 130 | guideway in pendulum mass carrier 10 for guide element 30 for swinging guidance of the pendulum mass 20, guideway for monofilar suspension, preferably roller breakout (e.g., stamped) |
| 140 | bearing surface/edge, guide way/edge, rolling face/edge on/in pendulum mass carrier 10 for counter bearing 40 for swinging support of the pendulum mass 20, preferably inner/outer axial edge of the pendulum mass carrier 10 in circumferential direction U |
| 160 | guideway in pendulum mass carrier 10 for guide element 30 for swinging guidance of the pendulum mass 20, guideway for bifilar suspension, preferably roller breakout (e.g., stamped) |
| 200 | disk-shaped, i.e., flat and comparatively thin basic body of the pendulum mass 20 or of the mass half 22 |
| 230 | (single) guideway in pendulum mass 20 for guide element 30 for swinging guidance of this pendulum mass 20, guideway for monofilar suspension, roller breakout (e.g., stamped) |
| 240 | cutout, in particular through cutout for counter bearing 40, (50) |
| 250 | cutout, in particular through cutout for fastening element 40, (50) |
| 260 | guideway (one of two) in pendulum mass 20 for guide element 30 for swinging guidance of this pendulum mass 20, guideway for bifilar suspension, roller breakout (e.g., stamped) |
| A | axial direction, longitudinal direction of the centrifugal pendulum device 1, of the pendulum mass carrier 10, of the pendulum mass 20, of the damper device, of the torque transfer device, etc. |
| R | radial direction of the centrifugal pendulum device 1, of the pendulum mass carrier 10, of the pendulum mass 20, of the damper device, of the torque transfer device, etc. |
| S | axis of rotation of the centrifugal pendulum device 1, of the pendulum mass carrier 10, of the pendulum mass 20, of the damper device, of the torque transfer device, etc. |
| U | circumferential direction of the centrifugal pendulum device 1, of the pendulum mass carrier 10, of the pendulum mass 20, of the damper device, of the torque transfer device, etc. |

What is claimed is:

1. A centrifugal pendulum device for a damper device or a torque transfer device comprising:
   a pendulum mass carrier rotatable around an axis of rotation;
   a plurality of pendulum masses movable in a circumferential direction in relation to the pendulum mass carrier being suspended on the pendulum mass carrier, at least one individual pendulum mass of the plurality of pendulum masses being suspended on the pendulum mass carrier via a single guide element; and
   a counter bearing supporting the individual pendulum mass being additionally on the pendulum mass carrier, the counter bearing being radially outside of the single guide element and being arranged and configured for sliding along a bearing surface of the pendulum mass carrier,
   wherein at least one of the pendulum masses is suspended bifilarly on the pendulum mass carrier and the counter bearing and the bearing surface assigned thereto are lacking on the pendulum mass carrier.

2. The centrifugal pendulum device as recited in claim 1 wherein:
   the individual pendulum mass is suspended monofilarly on the pendulum mass carrier via the single guide element;
   a single guideway of the individual pendulum mass being provided in the circumferential direction of the individual pendulum mass and centered in the individual pendulum mass;
   the individual pendulum mass and the single guideway being designed mirror symmetrical in reference to a centerline of the individual pendulum mass extending in a radial direction; or
   the single guideway of the individual pendulum mass extends from a center section radially outward within the pendulum mass.

3. The centrifugal pendulum device as recited in claim 2 wherein the single guideway of the individual pendulum mass extends from a center section radially outward within the pendulum mass in an arc shape.

4. The centrifugal pendulum device as recited in claim 1 wherein the pendulum mass carrier includes a plurality of guideways for the pendulum masses, wherein:
   all of the guideways of the pendulum mass carrier for the pendulum masses being provided rotationally symmetrically to each other in reference to a guideway directly adjacent in the circumferential direction;
   all of the guideways of the pendulum mass carrier for the pendulum masses are directly adjacent to each other at 180°, 120°, 90°, 72°, 60°, 51.4° or 45°; or
   at least one of the guideways of the pendulum mass carrier extends from a center section radially inward within the pendulum mass carrier.

5. The centrifugal pendulum device as recited in claim 4 wherein the guideway of the pendulum mass carrier extends from a center section radially inward within the pendulum mass carrier in an arc shape.

6. The centrifugal pendulum device as recited in claim 1 wherein the pendulum mass carrier has a bearing surface upon which the counter bearing is actable.

7. The centrifugal pendulum device as recited in claim 1 wherein the bearing surface is provided on an outer circumferential edge of the pendulum mass carrier.

8. The centrifugal pendulum device as recited in claim 1 wherein the counter bearing is configured to mechanically pre-tension radially outward the individual pendulum mass, the individual pendulum mass firmly connected mechanically to the counter bearing.

9. The centrifugal pendulum device as recited in claim 8 wherein the counter bearing is a spring support having a radial spring.

10. The centrifugal pendulum device as recited in claim 8 wherein the counter bearing is a roller bearing.

11. The centrifugal pendulum device as recited in claim 1 wherein
- guideways of the pendulum mass carrier, guideways of the pendulum masses or bearing surfaces of the pendulum mass carrier are designed in such a way that at a minimal oscillation angle of the centrifugal pendulum device, a guide element and the counter bearing assigned thereto lie on a straight connecting line that runs through the axis of rotation, or
- at an oscillation angle of the centrifugal pendulum device greater than the minimal oscillation angle, the straight connecting line of the guide element and the counter bearing assigned thereto does not run through the axis of rotation.

12. The centrifugal pendulum device as recited in claim 1 wherein monofilar and bifilar suspensions of the pendulum masses alternate with each other in the circumferential direction on the pendulum mass carrier, and
- one of the pendulum masses having bifilar suspension in the circumferential direction in reference to an arc length covers a larger section than a further pendulum mass having monofilar suspension, or
- one of the pendulum masses having bifilar suspension has a greater mass than a further pendulum mass having monofilar suspension.

13. A trapezoidal centrifugal pendulum device comprising the centrifugal pendulum device as recited in claim 1.

14. A drivetrain of a motor vehicle comprising the centrifugal pendulum device as recited in claim 1.

15. A centrifugal pendulum device for a damper device or a torque transfer device comprising:
- a pendulum mass carrier rotatable around an axis of rotation, and
- a plurality of pendulum masses movable in a circumferential direction in relation to the pendulum mass carrier being suspended on the pendulum mass carrier, the plurality of pendulum masses including at least two first pendulum masses and at least two second pendulum masses, each of the first pendulum masses including two first mass halves each including two guideways for circumferentially movably supporting the first pendulum masses on the pendulum mass carrier, each of the second pendulum masses including two second mass halves each including only a single guideway for circumferentially movably supporting the second pendulum masses on the pendulum mass carrier.

16. The centrifugal pendulum device as recited in claim 1 wherein the pendulum mass carrier includes a first pair of guideways for bifilar suspension of a first of the pendulum masses and a second pair of guideways for bifilar suspension of a second of the pendulum masses, the first pair of guideways being provided rotationally symmetrically the second pair of guideways, the first and second pairs of guideways being offset from each other by 180°, 120°, 90°, 60° or 45°.

17. A centrifugal pendulum device for a damper device or a torque transfer device comprising:
- a pendulum mass carrier rotatable around an axis of rotation;
- a plurality of pendulum masses movable in a circumferential direction in relation to the pendulum mass carrier being suspended on the pendulum mass carrier, at least one individual pendulum mass of the plurality of pendulum masses being suspended on the pendulum mass carrier via a single guide element; and
- a counter bearing supporting the individual pendulum mass being additionally on the pendulum mass carrier,
- wherein a further pendulum mass is also suspended bifilarly on the pendulum mass carrier by two guide elements.

* * * * *